United States Patent [19]

Oku et al.

[11] Patent Number: 4,928,742
[45] Date of Patent: May 29, 1990

[54] PNEUMATIC RADIAL TIRE

[75] Inventors: Masahiro Oku, Osaka; Kazumitsu Iwamura, Kobe, both of Japan

[73] Assignee: Sumitomo Rubber Industries, Ltd., Hyogo, Japan

[21] Appl. No.: 257,000

[22] Filed: Oct. 13, 1988

[30] Foreign Application Priority Data

Oct. 13, 1987 [JP] Japan .................. 62-259246

[51] Int. Cl.$^5$ .............................................. B60C 9/18
[52] U.S. Cl. ...................................... 152/534; 152/538
[58] Field of Search .............. 152/526, 534, 535, 538, 152/560

[56] References Cited

U.S. PATENT DOCUMENTS

| | | | |
|---|---|---|---|
| 2,958,359 | 11/1960 | Boussu et al. | 152/534 |
| 3,335,777 | 8/1967 | Hutch | 152/535 |
| 3,677,319 | 7/1972 | Mirtain | 152/535 X |
| 4,407,347 | 10/1983 | Mirtain | 152/534 X |

*Primary Examiner*—Raymond Hoch

*Attorney, Agent, or Firm*—Birch, Stewart, Kolasch & Birch

[57] ABSTRACT

A pneumatic radial tire, which comprises a carcass of at least one ply of radially arranged cords turned up around bead cords from the inside to the outside thereof, and a breaker disposed radially outside the carcass, the breaker comprising at least two radially adjacent plies of cords, the breaker having at least a portion in which the cords of each of the two plies are inclined with respect to an equatorial plane of the tire and the cords of one ply are inclined oppositely to the cords of the other ply, the cords of each of the breaker plies being so arranged that the cord angle QC in a crown portion of the breaker with respect to the equatorial plane differs from the cord angle QS in each of the shoulder portions of the breaker with respect to the equatorial plane, wherein the crown portion is centered on a tire equator and has a width of 0.4 to 0.8 times the maximum width of the breaker, and the shoulder portions are located one on each side of the crown portion, whereby both steering stability and ride comfort are improved in a well balanced manner.

10 Claims, 4 Drawing Sheets

PNEUMATIC RADIAL TIRE

The present invention relates to a pneumatic radial tire, in which both steering stability and ride comfort characteristics are improved in a well balanced manner, and therefore which can be used most suitably for passenger cars.

Pneumatic radial tires have been widely used for their excellent steering stability and low fuel consuming characteristic. However, recent remarkable improvements of vehicle performances require further improvement of the steering stability, and thus, the radial tires show a tendency to have a low aspect ratio, while required to exhibit more improved riding comfort.

In general, the vertical rigidity of the whole tire largely affects the ride comfort, and this ride comfort becomes aggravated with the increase in the vertical rigidity. On the other hand, the steering stability is mainly affected by the lateral rigidity of the whole tire, and an increase in this lateral rigidity improves the steering stability. However, when the lateral rigidity of the tire is increased to improve the steering stability, the vertical rigidity is also increased and consequently the ride comfort is liable to be aggravated. Thus, the improvement in ride comfort and the improvement in stable driving are generally antinomic requirements.

In order to solve a part of such a problem, partially changing the angles of the carcass cords has been suggested in Japanese Patent Publication No. 53-8402. Presently, however, such a change in the carcars as a remedial measure is inadequate to provide the required characteristics.

As described above, the improvements in the ride comfort and the steering stability are generally antinomic, and further, between the vertical rigidity and the transverse rigidity, there is such a precise correlation that when one is increased, the other is also increased.

However, by the inventors' study of the relation between the angles of the breaker cords and the bending rigidity of the breaker in both the widthwise direction and the thicknesswise direction of the breaker, and further by the study of the contributions of the tread crown portion and the tread shoulder portions to the improvements in the steering stability and the ride comfort, it was discovered that, by changing the angles of the breaker cords in the crown portion from those in the shoulder portions, the tire as a whole can be improved in both ride comfort and steering stability in a well balanced manner according to the aim or use of the tire.

Generally, when the bending rigidity of the breaker in the thicknesswise direction thereof (hereinafter referred as "perpendicular bending rigidity") is decreased, the vertical rigidity of the tire is also decreased, and accordingly the ride comfort is improved. On the other hand, when the bending rigidity of the breaker in the widthwise direction thereof (hereinafter referred as "lateral bending rigidity") is increased, the lateral rigidity of the tread is also increased, which improves the steering stability.

In a breaker having at least two plies of cords arranged so that the cords of each ply cross the cords of the next ply, when the angles of the breaker cords to the equatorial plane of the tire are changed within a certain extent, the perpendicular bending rigidity takes minimum value at a certain breaker cord angle, while the lateral bending rigidity takes maximum value. FIG. 4 shows relations between breaker cord angle and evaluations in the steering stability and the ride comfort for a radial tire for passenger cars having an aspect ratio of 82% and provided with a breaker of two plies in which the cords of the inner ply are arranged at the same angle as that of the outer ply, but in the opposite direction.

It is understood from FIG. 4 that the steering stability and the ride comfort are both improved by increasing the breaker cord angle in a range of under 17 degrees. This is because, as shown typically in FIGS. 6 and 7, by increasing the breaker cord angles in such range, the perpendicular bending rigidity is decreased, but the lateral bending rigidity is increased. As the result, both ride comfort and steering stability can be improved.

Furthermore, FIG. 4 obviously shows that both characteristics become worse if the angle is increased over 19 degrees, and also show that the evaluation in the steering stability and the evaluation in the ride comfort reach maximum when the breaker angle is about 17 degrees and about 19 degrees, respectively.

Further, it was found that the breaker cord angles at the maximum values of both evaluations varies by the tire size, and have a tendency to be increased by decreasing the aspect ratio.

Between the above-mentioned angles at the maximum values, both characteristics have reciprocal tendencies. This is because of the fact that the angles at which the evaluation in the lateral bending rigidity becomes minimum or maximum values differ from those in the the perpendicular bending rigidity.

Here, it is noted again that the ride comfort can be improved by decreasing the vertical rigidity of the tire, and the steering stability can be improved by increasing the lateral rigidity of the tire. However, upon further consideration of the tread, the following facts were found. If the rigidity of the tread crown portion is increased, the directional stability is improved, and which contributes to the improvement in the steering stability. If the rigidity of the tread crown portion is decreased, the ride comfort can be improved. On the other hand, if the perpendicular bending rigidity in the tread shoulder portion in which the ground contacting pressure is high, is decreased, the ride comfort is improved. If the lateral bending rigidity in the tread shoulder portion is increased, the cornering power is also increased, whereby the steering stability at cornering is enhanced.

That is, it was found that the ride comfort and the steering stability can be improved in a well balanced manner by adjusting the rigidity of the tread crown portion and that of the tread shoulder portions in a proper manner. Therefore, the inventors considered such rigidities of the breaker which affect both characteristics as described above, and discovered that by changing the breaker cord angles in the crown portion from those in the shoulder portions both characteristics can be desirably improved in a well balanced manner.

It is therefore, an object of the present invention to provide a pneumatic radial tire, in which both steering stability and ride comfort are improved in a well balanced manner, and which can be used most suitably for passenger cars.

According to one aspect of the present invention, a pneumatic radial tire comprises a carcass of at least one ply of radially arranged cords turned up around bead cords from the inside the outside thereof, and a breaker disposed radially outside the carcass, the breaker comprising at least radially adjacent two plies of cords, the breaker having at least a portion in which the cords of each of the two plies are inclined with respect to a equatorial plane of the tire and the cords of one ply are inclined in a direction opposite to the cords of the other ply, the cords of each of the breaker plies so arranged that the cord angle QC in a crown portion of the breaker to the equatorial plane differs from the cord angle QS in each shoulder portions of the breaker to the equatorial plane, wherein the crown portion is centered on a tire equator and has a width of 0.4 to 0.8 times the maximum width of the breaker, and the shoulder portions are located one on each side of the crown portion.

An embodiment of the present invention will now be explained in detail referring to the drawings, in which.

Figure 5:
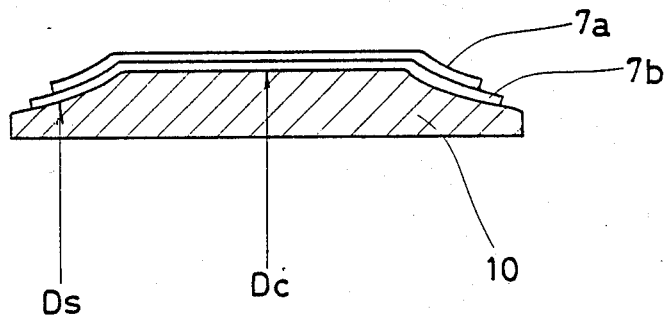
Figure 5:
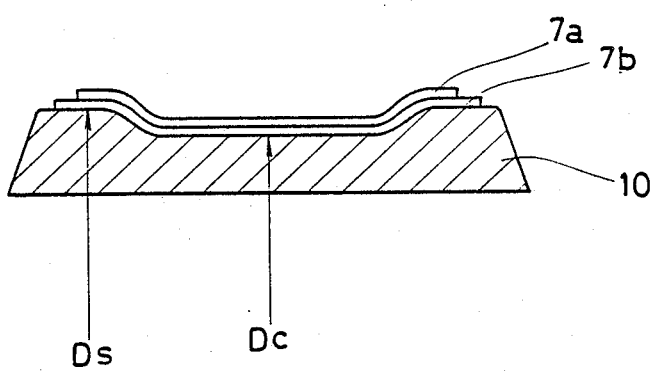
Figure 6:
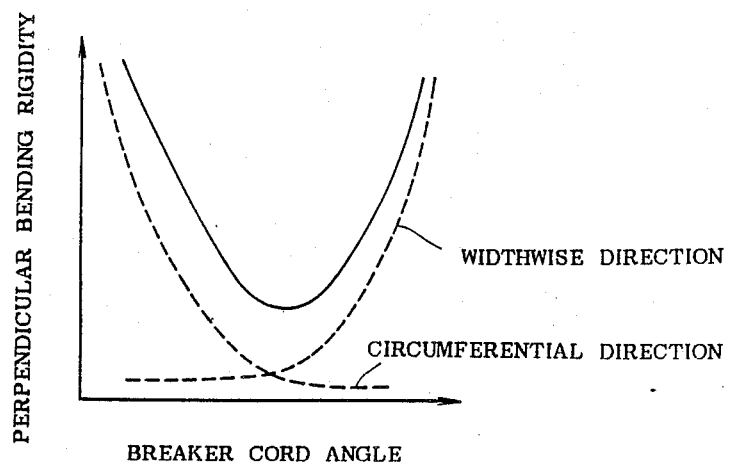
Figure 7:
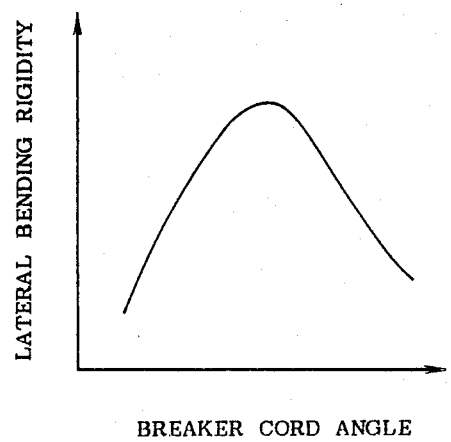

FIGS. 5 (a), (b) are cross sectional views each showing a method of forming breaker cords;

FIG. 6 is a graph showing a relationship between breaker cord angle and perpendicular bending rigidity of breaker; and FIG. 7 is a graph showing a relationship between breaker cord angle and lateral bending rigidity of breaker.

Figure 1:
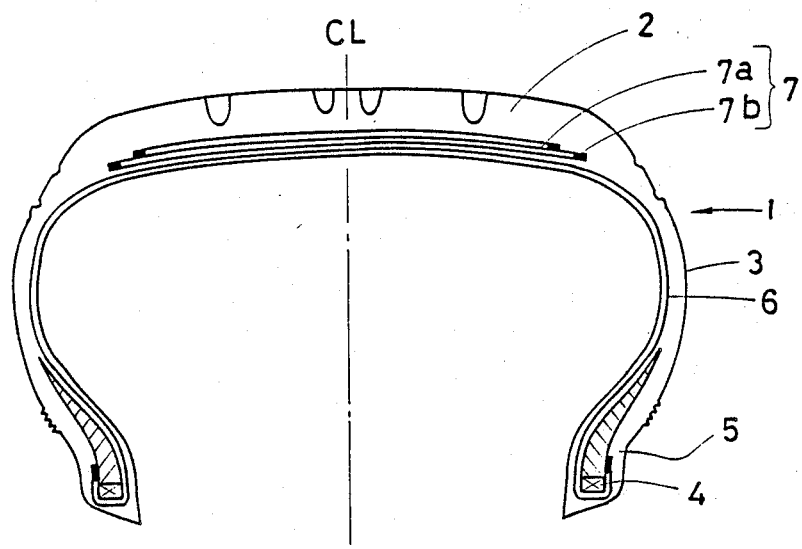
FIG. 1 is a cross sectional view showing an embodiment of the present invention.
Figure 2:
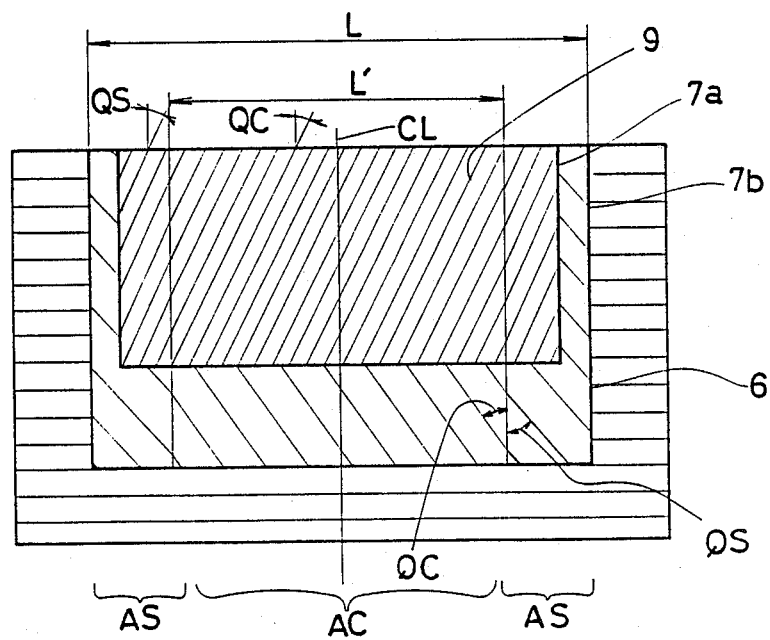
FIG. 2 is a developed view showing the breaker and the carcass thereof.

In FIGS. 1 and 2, tire 1 has an annular tread portion 2, sidewall portions 3 extending radially inwardly one from each edge thereof, and bead portions 5 each located at the inner ends of each sidewall portion, and the tire comprises a pair of bead cores 4 one disposed in each bead portion 5, a carcass 6 turned up in both edge portions around the bead cores 4 from the inside to the outside thereof to be secured thereto and a breaker 7 disposed radially outside the carcass.

The carcass comprises a ply of substantially radially arranged cords. For the carcass cords, nylon, polyester, aromatic polyamide, or metal cords, or glass fiber cords can be employed. In this example, the carcass 6 of only one ply, but in the present invention the one of plural plies may be used.

The breaker 7 in this example comprises two plies of cords: an radially inner ply 7b and an outer ply 7a. Further, the breaker cords are made of metal cords, and inclined with respect to the tire equatorial plane.

FIG. 2 show the cord arrangements of the breaker 7 and the carcass 6.

The breaker 7 is for the sake of illustration divided into a crown portion AC centered on the equatorial plane CL of the tire and two shoulder portions AS one on each side thereof.

In each of the inner ply 7b and the outer ply 7a, the cord angle QC in the crown portion AC to the tire equatorial plane CL is, in this example, larger than the cord angle QS in each shoulder portion AS to the tire equatorial plane CL, and further in this example the cord angle QC in the crown portion of the inner ply 7b is the same as the cord angle QC in the crown portion of the outer ply 7a, but the inner ply cords are inclined reversely to the outer ply cords.

Similarly, in each shoulder portion AC, the inner ply cords are inclined in a reverse direction to the outer ply cords. The cord angle QS of the inner ply 7b, however, may differ from the cord angle QS of the outer ply 7a.

Besides, in each of the outer ply 7a and the inner ply 7b, the breaker cords 9 shown in the drawings are bent sharply in the respective border regions between the shoulder portions AS and the crown portion AC, but this does not prevent such smooth bend as formed by applying a circular arc.

The the breaker cords 9 must be extended continuously across both portions AC and AS without any break. If there are some breaks, particularly which are located in the borders between the points AC and AS, the break ends of the cords move individually when in the time of ground contacting, and which is undesirable from points of view of the durability and the steering stability.

Preferably, the width LC of the crown portion AC is 0.4 to 0.8 times the maximum width L of the breaker 7 measured in parallel with the tire axial direction. If the width LC exceeds 0.8 times the width L, the effect from the crown portion AS becomes over strengthened. On the other hand, if LC is less than 0.4 times L, the effect from the shoulder portions AC becomes over strengthened. Thus, if the width LC is set out of the range, it becomes very difficult to satisfy the above-mentioned two characteristics at the same time.

The above-mentioned breaker cord angles QC and QS, in this example QC>QS, are determined from such characteristics as shown in FIGS. 6 and 7 which depends on the tire size so as to be improved in both ride comfort and steering stability in such manner that the shocks from the road surface during running are absorbed by the crown portion AC with a low perpendicular bending rigidity, and the deformation of the breaker during cornering is reduced by the shoulder portions with a high lateral bending rigidity.

The difference between the angle QC and the angle QS of the above-mentioned breaker cords is preferably not less than 2 degrees. If it is less than 2 degrees, the effect from each portion can not be obtained, and it becomes difficult to improve both the above-mentioned characteristics.

Moreover, it is preferred to maintain the breaker cord angles QC and QS in a range of 15 to 35 degrees throughout all portions of the breaker 7. In general, if the angles are less than 15 degrees, the perpendicular bending rigidity of the breaker 7 is excessively increased so it becomes difficult to improve the ride comfort, and the lateral bending rigidity thereof, that is, the steering stability is decreased. On the other hand, if the angles are more than 35 degrees, the circumferential tensile rigidity of the breaker is sharply reduced, and accordingly the hoop effect thereof which is a fundamental aim of the breaker 7 is also reduced, and which may produce an evil effect on another characteristic.

Figure 3:
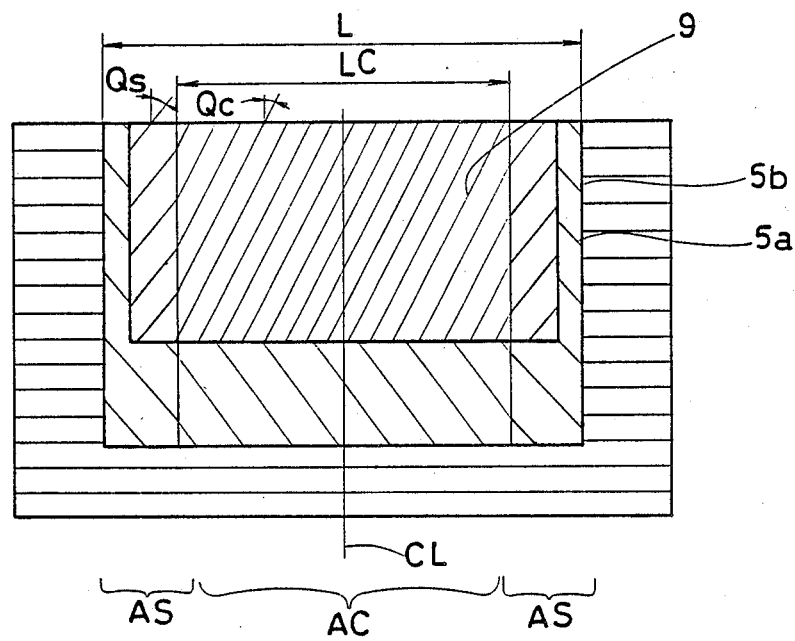
FIG. 3 is a developed view showing another embodiment of the present invention.
Figure 4:
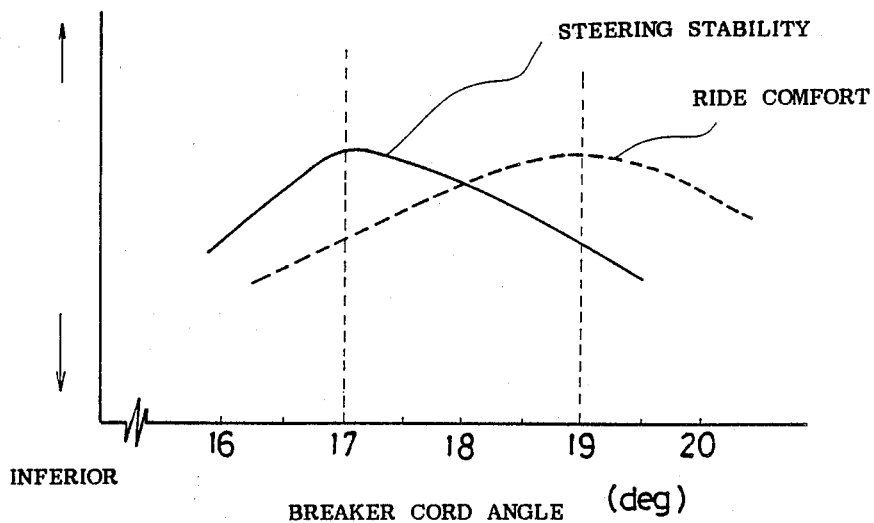
FIG. 4 is a graph showing a relationship between breaker cord angle and steering stability and a relationship between the breaker cord angle and ride comfort.

FIG. 3 shows another embodiment of the present invention, in which the breaker cord angle QC in the crown portion AC is smaller than the breaker cord angle QS in each shoulder portion AS. In this embodiment, contrary to the above-mentioned embodiment, the crown portion AC which has a resultant high lateral bending rigidity contributes to the improvement in the steering stability, and the shouler portions AS which has a low perpendicular bending rigidity improves the ride comfort.

As shown in FIGS. 5(a) and 5(b), the above-mentioned breakers 7, that is, the breakers in the first and second embodiments are obtained by: sticking the breaker plies 7a and 7b around the circumference of a breaker forming drum—the diameter of which changes sharply between the center portion (DC) and both side portions (DS)—so that each ply has a uniform cord angle; applying the breaker plies around the shaped carcass and further applying other components thereon; and then vulcanizing it in a vulcanizing machine.

WORKING EXAMPLES

Test tires of 205/60R15 shown in Table 1 were made as working examples of the present invention and reference tires by way of trial.

The test tires each comprises a carcass of polyester cords, a breaker of metal cords, and a pair of bead core, and have identical specifications except the breaker cord angles.

The reference tire 1 is a conventional one in which the breaker cord angles are uniform.

The reference tire 2 is the one in which the breaker cord angles are smaller than those of the reference tire 1.

The reference tire 3 is the one in which the breaker cord angles are larger than those of the reference tire 1.

The working example tires 1 and 2 are tires of the present invention in which the breaker cord angles are changed between the crown portion AC and the shoulder portions AS.

The test tires of each kind were mounted on a 1800 cc passenger car made in Japan, and ran on a given course, to evaluate its steering stability and ride comfort through driver's feeling. The results are indicated in the bottom columns of the Table 1, using an index based on the assumption that the evaluations of the the reference tire 1 are 100. (The larger the value is, the better the characteristic is.)

TABLE 1

| Tire | Ref. 1 | Ref. 2 | Ref. 3 | Ex. 1 | Ex. 2 |
| --- | --- | --- | --- | --- | --- |
| L (mm) | 168 | 168 | 168 | 168 | 168 |
| QC (deg) | 22 | 19 | 24 | 24 | 19 |
| QS (deg) | 22 | 19 | 24 | 19 | 24 |
| LC (mm) | 168 | 168 | 168 | 116 | 116 |
| Steering stability | 100 | 120 | 85 | 110 | 100 |
| Ride comfort | 100 | 90 | 115 | 105 | 110 |

As compared with the reference tire 1, the reference tire 2 was higher in the lateral bending rigidity of the breaker, whereby the steering stability was improved, but the ride comfort become worse because it is also higher in the perpendicular bending rigidity of the breaker. The reference tire 3 had the opposite tendency.

The working example tire 1 was improved in both steering stability and ride comfort as compared with the reference tire 1.

The working example tire 2 was in the same level as the reference tire 1 in steering stability, but the ride comfort was improved as compared with that of the reference tire 1.

As described above, in the pneumatic radial tire of the present invention, by changing the breaker cord angles between the crown portion and the shoulder portions, the steering stability and the ride comfort can be improved well-balancedly according to the purposes of the tire.

We claim:

1. A pneumatic radial tire comprising:
    a carcass of at least one ply of radially arranged cords turned up around bead cords from the inside to the outside thereof, and
    a breaker comprising at least two radially adjacent plies of cords disposed radially outside said carcass,
    said breaker having at least a portion in which the cords of each of said two plies are inclined with respect to an equatorial plane of the tire and the cords of one ply are inclined in a direction opposite to the cords of the other ply,
    said cords of each of said breaker plies being arranged such that the cord angle in a crown portion of the breaker with respect to the equatorial plane is larger than the cord angle in each shoulder portion of the breaker with respect to the equatorial plane,
    the difference between said cord angle in the crown portion and said cord angle in the shoulder portions being not less than 2 degrees, and said cord angles being in the range of 15 to 35 degrees throughout all of the portions of the breaker,
    wherein said crown portion is centered on a tire equator and has a width of 0.4 to 0.8 times the maximum width of the breaker, and said shoulder portions are located one on each side of said crown portion.

2. The pneumatic radial tire according to claim 1, wherein said breaker cords are metal cords.

3. The pneumatic radial tire according to claim 1, wherein the cord angles are in the range of 19 to 24 degrees throughout all portions of the breaker.

4. The pneumatic radial tire according to claim 1, wherein the difference between said cord angle in the crown portion and said cord angle in the shoulder portions of the breaker is 2 to 5 degrees.

5. The pneumatic radial tire according to claim 3, wherein the difference between said cord angle in the crown portion and said cord angle in the shoulder portions of the breaker is 2 to 5 degrees.

6. A pneumatic radial tire comprising:
    a carcass of at least one ply of radially arranged cords turned up around bead cords from the inside to the outside thereof, and
    a breaker comprising at least two radially adjacent plies of cords disposed radially outside said carcass,
    said breaker having at least a portion in which the cords of each of said two plies are inclined with respect to an equatorial plane of the tire and the cords of one ply are inclined in a direction opposite to the cords of the other ply,
    said cords of each of said breaker plies being arranged such that the cord angle in a crown portion of the breaker with respect to the equatorial plane is smaller than the cord angle in each shoulder portion of the breaker with respect to the equatorial plane,
    the difference between said cord angle in the crown portion and said cord angle in the shoulder portions being not less than 2 degrees, and the cord angles being in the range of 15 to 35 degrees throughout all of the portions of the breaker,
    wherein said crown portion is centered on a tire equator and has a width of 0.4 to 0.8 times the maximum width of the breaker, and said shoulder portions are located one on each side of said crown portion.

7. The pneumatic radial tire according to claim 6, wherein said breaker cords are metal cords.

8. The pneumatic radial tire according to claim 6, wherein the cord angles are in the range of 19 to 24 degrees throughout all portions of the breaker.

9. The pneumatic radial tire according to claim 6, wherein the difference between said cord angle in the crown portion and said cord angle in the shoulder portions of the breaker is 2 to 5 degrees.

10. The pneumatic radial tire according to claim 8, wherein the difference between said cord angle in the crown portion and said cord angle in the shoulder portions of the breaker is 2 to 5 degrees.

* * * * *